Patented Aug. 5, 1947

2,425,288

UNITED STATES PATENT OFFICE 2,425,288

PLASTICIZED BUTADIENE POLYMER COMPOSITIONS CONTAINING PHTHALIMIDO-ALKYL ALKANOATES

Philip F. Tryon, Terre Haute, Ind., assignor to Commercial Solvents Corporation, Terre Haute, Ind., a corporation of Maryland No Drawing. Application January 8, 1945,
Serial No. 571,966

5 Claims. (Cl. 260—36)

This invention relates to plasticized elastomer compositions and more particularly to such compositions in which so-called synthetic rubbers are plasticized or softened with softening agents of the class of phthalimides of fatty acid esters.

In the manufacture and compounding of rubber and synthetic rubber, it is necessary to bring the compound into a plastic state so that pigments, fillers, and the like can be incorporated therein, and so that the product can be molded into the desired shape before vulcanizing. In the case of natural rubber, simple heating by the friction of milling on a roller mill induces the necessary degree of plasticity for these purposes.

The so-called synthetic rubbers or synthetic elastomers on the other hand do not respond easily to milling treatment and often become hard and brittle or crumble when subjected to such milling. It is, therefore, essential to add to many of the synthetic elastomers softening or plasticizing agents to facilitate satisfactory milling and forming operations.

It is desirable that such softeners not only plasticize the elastomer, but that they shall not seriously decrease the tensile strength and stretching capacities of the plasticized material.

I have found that phthalimides of fatty acid esters that is, the phthalimidoalkyl alkanoates, are excellent plasticizers for synthetic elastomers and impart their beneficial softening properties without damage to the tensile strength and elongation characteristics of the resulting composition in many cases actually enhancing one or the other or both of these characteristics to some extent.

The imides utilizable as softening agents in my invention may be represented by the following structural formula

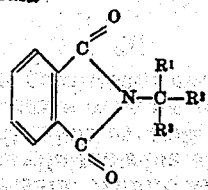

in which $R^1$ and $R^3$ represent hydrogen, alkyl or alkane-carbonyloxymethyl, $R^2$ represents alkane-carbonyloxymethyl.

The softening agents of my invention may be employed in conjunction with any of the synthetic rubbers prepared by copolymerization of 1,3-butadiene alone or copolymerized with other polymerizable monomers, which contain the polymerizable structure

among which may be mentioned the aryl olefines such as styrene and vinyl naphthalene; the alpha methylene carboxylic acids and their esters, nitriles and amides such as acrylic acid, methyl acrylate, methyl methacrylate, acrylonitrile, methacrylonitrile, methacrylamide; isobutylene, methyl vinyl ether and so on. My softening agents are especially effective when utilized with butadiene-acrylonitrile copolymers, which are generally recognized as among the most difficult of the elastomers to plasticize.

Among the compounds coming within the above formula may be mentioned 2-phthalimidoethyl caproate; 2-phthalimidoisobutyl acetate; 2-phthalimidoisobutyl laurate; 2-phthalimido-2-methyl-1,3-propanediol diacetate, and the like.

The phthalimides described may be prepared, for example, by the following procedure: the calculated amount of phthalic anhydride for imide formation is added to an equivalent quantity of a primary amino hydroxy compound, and heated at about 150° to 180° C. for several hours in a distillation apparatus until the calculated amount of water has distilled out. Then the equivalent amount of fatty acid desired for esterification is added, and the mixture is again heated for several hours at about 150° to 180° C. until esterification is complete. The product is then recovered, for example, by vacuum distillation.

The amount of plasticizer utilized will vary with the relative difficulty of plasticization of the particular elastomer involved and with the degree of softness desired. In general, such softeners can be employed in a wide range of proportions, and preferably within the range of concentrations varying from about ten to forty-five parts by weight of plasticizer for each 100 parts by weight of elastomer.

The plasticizers of my invention all impart a high degree of plasticity of elastomer compositions, without seriously reducing the tensile strength and elongation factors.

A convenient method for evaluating the effectiveness of plasticizing compositions comprises milling the composition in a standard rubber formula on a conventional rubber mill, and then measuring the extrusion time at various pressures in an extrusion plastometer, for example, in an instrument and according to a method similar to that described by J. H. Dillon in "Rubber Chemistry and Technology," vol. 9, pp. 496–501 (July 1936). In order to evaluate the effect of the plasticizer on the tensile and elongation properties of the elastomer, samples of the sheet are tested for these factors in the standard Scott tensile tester.

As illustrative of my invention, tnesile, elongation, and extrusion values as measured by the instruments above referred to, were run on several representative amides of the class described.

The plasticizer was added in each case in the indicated amount to the standard formula given below, and milled into the stock in the conventional manner.

Test composition

| | Parts by weight |
|---|---|
| Hycar OR (butadiene-acrylonitrile copolymer) | 100 |
| Zinc oxide | 5 |
| Stearic acid | 1 |
| Altax (benzothiazyl disulfide) | 1.5 |
| Sulfur | 1.5 |
| Carbon | 50 |
| Plasticizer | 30 |
| | 189.0 |

After milling, part of each sample was subjected to tensile and elongation tests, part was tested in the extrusion plastometer with the results given below:

Table

| Plasticizer | Tensile | Elong. | Extrusion Time in Seconds at— | |
|---|---|---|---|---|
| | | | 5½ lbs. | 7½ lbs. |
| Unplasticized batch | 2,280 | 247 | 738 | 210 |
| 2-phthalimidoisobutyl acetate | 3,110 | 390 | 51 | 28 |
| 2-phthalimidoisobutyl laurate | 3,060 | 395 | 13 | 9 |
| 2-phthalimido-2-methyl-1,3-propanediol diacetate | 3,860 | 440 | 44 | 41 |
| Dibutyl phthalate (control) | 2,980 | 480 | 37 | 19 |
| Tricresyl phosphate (control) | 2,540 | 395 | 60 | 35 |

In the above table, a reduction in extrusion time indicates an increase in plasticity, that is, the more "plastic" the composition the more rapidly will it extrude, at a given pressure. It will be observed, that in every case the plasticizing effects are striking, and in one case this effect is superior to the controls, dibutyl phthalate and tricresyl phosphate, which are usually run in conjunction with such tests for comparison.

It will also be observed, that in general, the compositions show no loss in tensile and elongation over the original unplasticized batch, a considerable increase in these characteristics is generally obtained.

While the above describes the preferred embodiments of my invention, it is to be understood that departures may be made therefrom within the scope of the specification and claims.

What is claimed is:

1. A composition comprising a rubber-like synthetic elastomer of the class consisting of 1,3-butadiene polymers, and copolymers of butadiene polymerized with other monomers having the polymerizable structure

and, as a softener therefor, a phthalimide of a fatty acid ester having the following structural formula

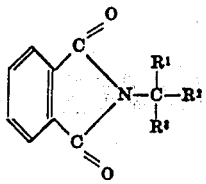

in which $R^1$ and $R^3$ are members selected from the group consisting of hydrogen, alkyl and alkanecarbonyloxymethyl, $R^2$ is alkanecarbonyloxymethyl.

2. A composition of matter comprising a rubber-like 1,3-butadiene-acrylonitrile copolymer and, as a softener therefor, a phthalimide of a fatty acid ester having the following structural formula

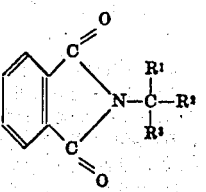

in which $R^1$ and $R^3$ are members selected from the group consisting of hydrogen, alkyl and alkanecarbonyloxymethyl and $R^2$ represents alkanecarbonyloxymethyl.

3. A composition comprising a rubber-like synthetic elastomer of the class consisting of 1,3-butadiene polymers, and copolymers of butadiene polymerized with other monomers having the polymerizable structure

and, as a softener therefor, 2-phthalimidoisobutyl acetate.

4. A composition comprising a rubber-like synthetic elastomer of the class consisting of 1,3-butadiene polymers, and copolymers of butadiene polymerized with other monomers having the polymerizable structure

and, as a softener therefor, 2-phthalimidoisobutyl laurate.

5. A composition comprising a rubber-like synthetic elastomer of the class consisting of 1,3-butadiene polymers, and copolymers of butadiene polymerized with other monomers having the polymerizable structure and, as a softener therefor, 2-phthalimido-2-methyl-1,3-propanediol diacetate.

PHILIP F. TRYON.

REFERENCES CITED

The following references are of record in the file of this patent:

UNITED STATES PATENTS

| Number | Name | Date |
|---|---|---|
| 2,325,947 | Garvey | Aug. 3, 1943 |

OTHER REFERENCES

Ind. & Eng. Chem., article by Fisher, pages 941–945, vol. 31, No. 8, August 1939.